US008311327B2

(12) United States Patent
Kress et al.

(10) Patent No.: US 8,311,327 B2
(45) Date of Patent: Nov. 13, 2012

(54) SYSTEM AND METHOD FOR BACKLIT IMAGE DETECTION

(75) Inventors: William C. Kress, Mission Viejo, CA (US); Jonathan Yen, San Jose, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/583,624

(22) Filed: Aug. 24, 2009

(65) Prior Publication Data

US 2011/0044541 A1 Feb. 24, 2011

(51) Int. Cl.
*G06K 9/00* (2006.01)
*G06K 9/34* (2006.01)
(52) U.S. Cl. ......... 382/168; 382/163; 382/164; 382/165
(58) Field of Classification Search ........... 382/162–172
See application file for complete search history.

(56) References Cited

U.S. PATENT DOCUMENTS

2007/0291317 A1* 12/2007 Kress .......................... 358/3.27
2009/0245636 A1* 10/2009 Yen et al. ..................... 382/172

FOREIGN PATENT DOCUMENTS

JP 2007011430 A * 1/2007
* cited by examiner

*Primary Examiner* — Vu Le
*Assistant Examiner* — Kenny Cese
(74) *Attorney, Agent, or Firm* — SoCal IP Law Group LLP; Steven C. Sereboff; Jonathan Pearce

(57) ABSTRACT

The subject application is directed to a system and method for detecting backlit images. Encoded color image data is first received into a computer having a processor and associated data storage. Histogram data is then calculated from the received encoded color image data, and a mid-tone range in normalized histogram data is then detected. A zone of normalized pixel counts within the mid-tone range is then selected. Data representing an entry point and an exit point of the normalized histogram data relative to the selected zone is then generated. A plateau area is detected in the histogram data in the selected zone between the entry point and the exit point. Thereafter, a backlit image detection signal is generated indicating whether a backlit image portion is present in the color image data according to the plateau detection.

12 Claims, 20 Drawing Sheets
(10 of 20 Drawing Sheet(s) Filed in Color)

BACKLIT SCENE

ACCUMULATED HISTOGRAM
OF BACKLIT SCENE

SYSTEM AND METHOD FOR BACKLIT IMAGE DETECTION

BACKGROUND OF THE INVENTION

The subject application is directed generally to detection of characteristics in electronically encoded images. The application is particularly applicable to detection of one or more portions of an electronic image wherein an object is backlit.

Early image capturing systems involved shutters, lenses, and photo-sensitive material that was chemically changed when exposed to light. More recently, image capture is done with digital imaging devices, such as digital cameras or scanners. A problem area has existed for all variants of image capturing systems when an object, such as a human or building in a captured image, is subject to backlighting. Backlighting exists when the object is between a light source and the image capturing device, such as a camera. The relative intensity of the backlit area to the lighting of the object can wash out or otherwise obscure the features in the object.

Early attempts at obfuscating the effects of backlighting included repositioning a subject relative to the light and image capturing device, such as a camera. By way of example, a photographer may reorient a person so that the sun is to the photographer's back and the subject is positioned to his front. In other situations, a photographer may use a flash to give better illumination of a subject relative to the backlighting.

It is frequently undesirable or impracticable to reposition a subject to avoid backlighting issues. Detection of a backlighting situation allows for steps to be taken to compensate for the deleterious affects.

SUMMARY OF THE INVENTION

In accordance with one embodiment of the subject application, there is provided a system and method for detecting backlit images. Encoded color image data is first received into a computer having a processor and associated data storage. Histogram data is then calculated from the received encoded color image data. A mid-tone range in normalized histogram data is then detected, and a zone of normalized pixel counts within the mid-tone range is selected. Data representing an entry point and an exit point of the normalized histogram data relative to the selected zone is then generated. A plateau area is detected in the histogram data in the selected zone between the entry point and the exit point. Thereafter, a backlit image detection signal is generated indicating whether a backlit image portion is present in the color image data based upon an output of the plateau detection.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawings will be provided by the Office upon request and payment of the necessary fee. The subject application is described with reference to certain figures, including.

DETAILED DESCRIPTION OF THE PREFERRED EMBODIMENT

The subject application is directed to a system and method for the detection of characteristics in electronically encoded images. In particular, the subject application is directed to a system and method for detecting one or more portions of an electronic image wherein an object is backlit. More particularly, the subject application is directed to a system and method for detecting backlit images. It will become apparent to those skilled in the art that the system and method described herein are suitably adapted to a plurality of varying electronic fields employing data detection and correction, including, for example and without limitation, communications, general computing, data processing, document processing, financial transactions, vending of products or services, or the like. The preferred embodiment, as depicted in FIG. 1, illustrates a document or imaging processing field for example purposes only and is not a limitation of the subject application solely to such a field.

Figure 1:
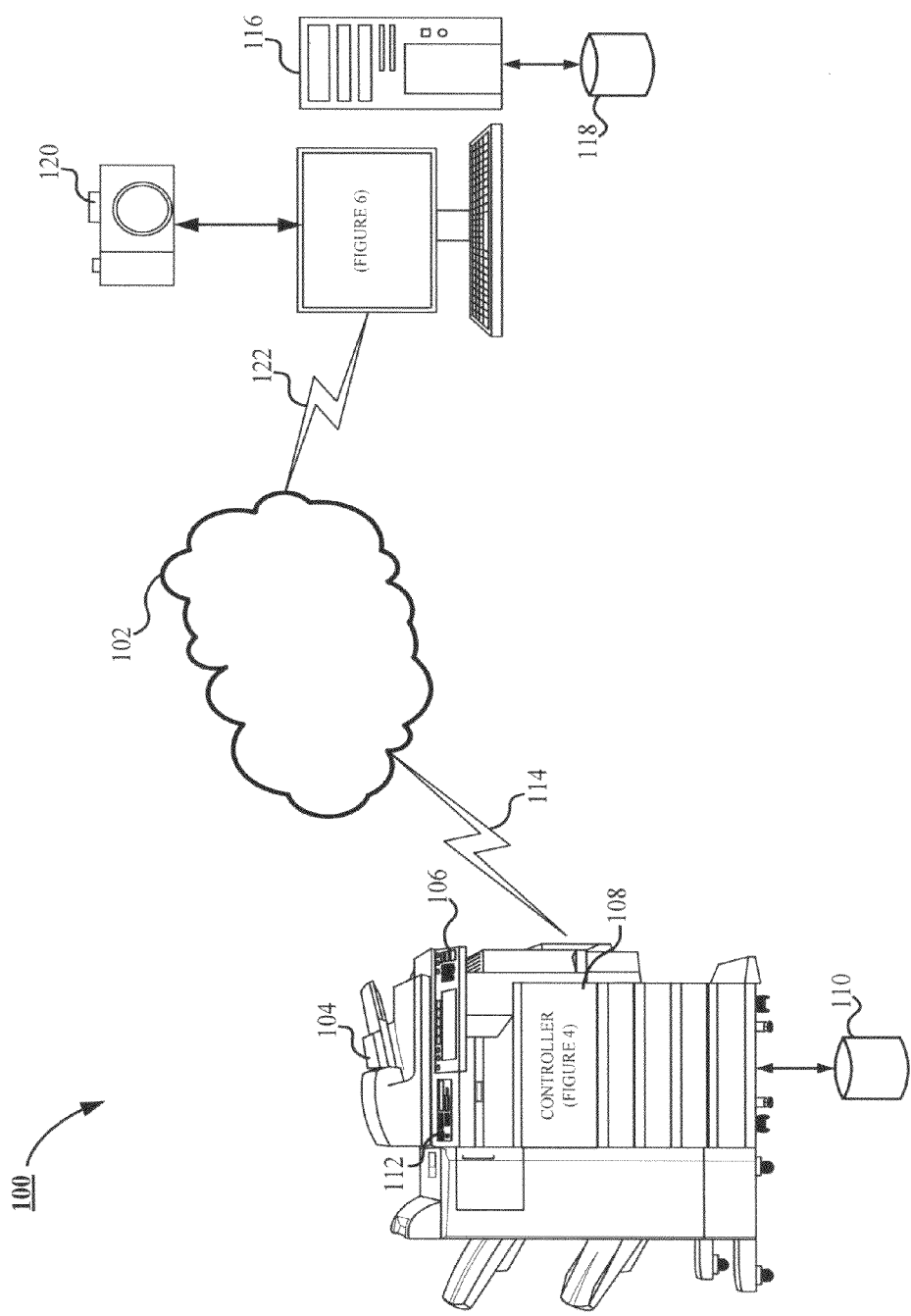
FIG. 1 is an overall diagram of a system for backlit image detection according to one embodiment of the subject application.

Referring now to FIG. 1, there is shown an overall diagram of a type system 100 for detecting backlit images in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for detecting backlit images. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, document data, image data, electronic database data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like. The document processing device of FIG. 1 also includes a portable storage device reader 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

Also depicted in FIG. 1 is a user device, illustrated as a computer workstation 116 in data communication with the computer network 102 via a communications link 122. It will be appreciated by those skilled in the art that the computer workstation 116 is shown in FIG. 1 as a workstation computer for illustration purposes only. As will be understood by those skilled in the art, the computer workstation 116 is representative of any personal computing device known in the art including, for example and without limitation, a laptop computer, a personal computer, a personal data assistant, a web-enabled cellular telephone, a smart phone, a proprietary network device, or other web-enabled electronic device. According to one embodiment of the subject application, the workstation 116 further includes software, hardware, or a suitable combination thereof configured to interact with the document processing device 104, or the like.

The communications link 122 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the computer workstation 116 is suitably adapted to provide document data, job data, user interface data, image data, monitor document processing jobs, employ thin-client interfaces, generate display data, generate output data, or the like, with respect to the document rendering device 104, or any other similar device coupled to the computer network 102. The functioning of the computer workstation 116 will better be understood in conjunction with the block diagram illustrated in FIG. 6, explained in greater detail below.

Communicatively coupled to the computer workstation 116 is a suitable memory, illustrated in FIG. 1 as the data storage device 118. According to one embodiment of the subject application, the data storage device 118 is any mass storage device known in the art including, for example and without limitation, magnetic storage drives, a hard disk drive, optical storage devices, flash memory devices, or any suitable combination thereof. In accordance with one embodiment of the subject application, the data storage device 118 is suitably adapted to store scanned image data, modified image data, document data, image data, color processing data, or the like. It will be appreciated by those skilled in the art that while illustrated in FIG. 1 as being a separate component of the system 100, the data storage device 118 is capable of being implemented as an internal storage component of the computer workstation 116, such as, for example and without limitation, an internal hard disk drive, or the like Additionally, the system 100 of FIG. 1 depicts an image capture device, illustrated as a digital camera 120 in data communication with the workstation 116. The skilled artisan will appreciate that the camera 120 is representative of any image capturing device known in the art, and is capable of being in data communication with the document processing device 104, the workstation 116, or the like. In accordance with one embodiment of the subject application, the camera 120 is capable of functioning as a portable storage device via which image data is received by the workstation 116, as will be understood by those skilled in the art.

Figure 2:
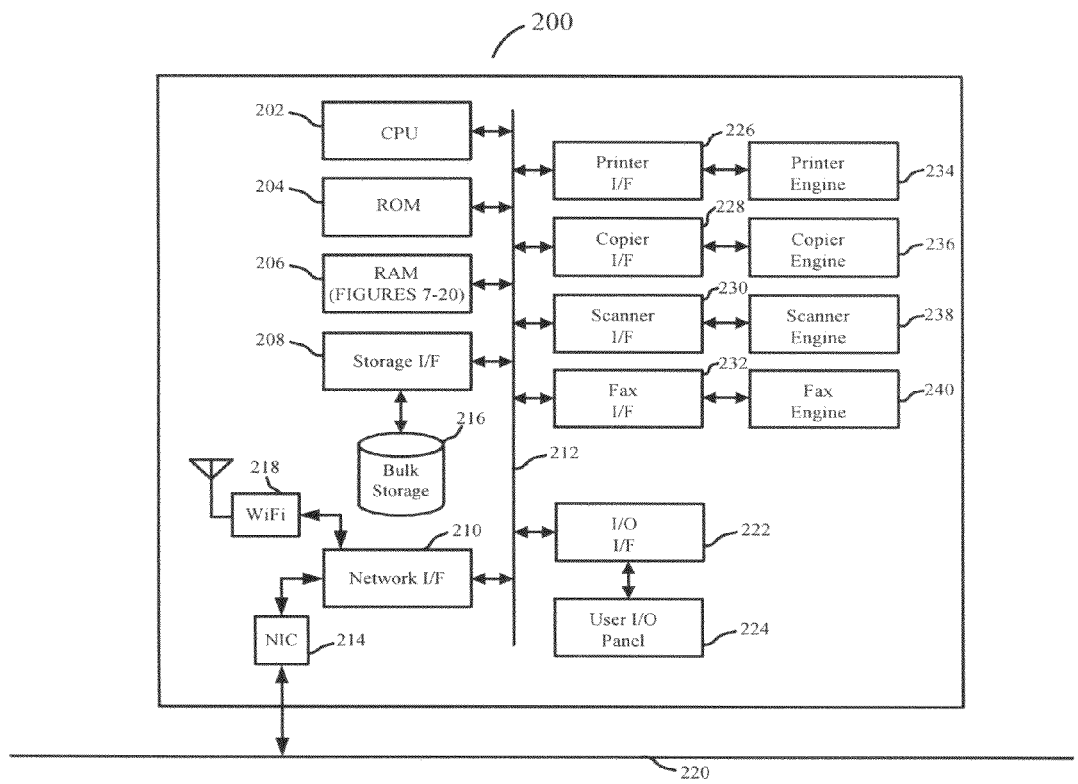
FIG. 2 is a block diagram illustrating device hardware for use in the system for backlit image detection according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
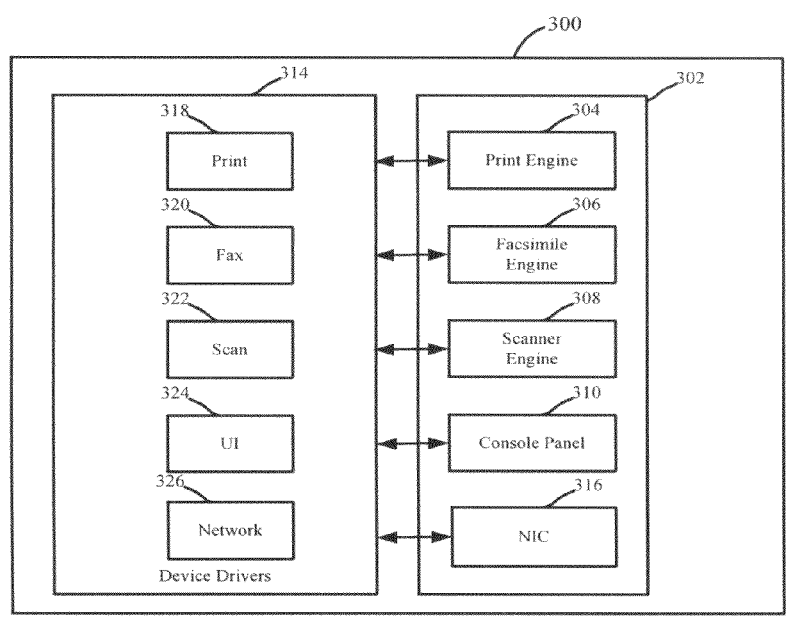
FIG. 3 is a functional diagram illustrating the device for use in the system for backlit image detection according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
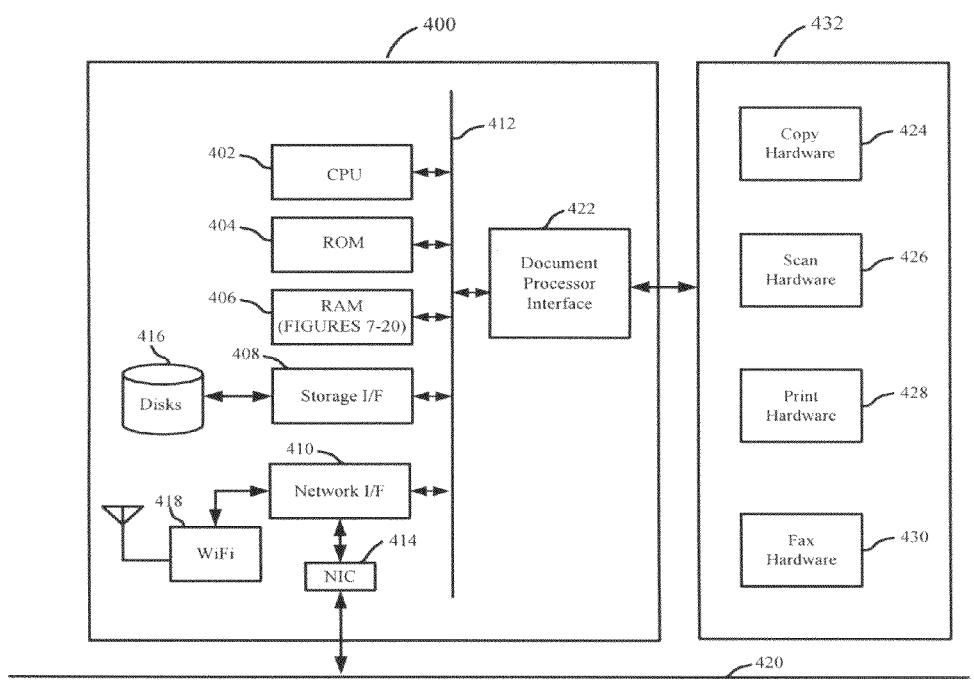
FIG. 4 is a block diagram illustrating controller hardware for use in the system for backlit image detection according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
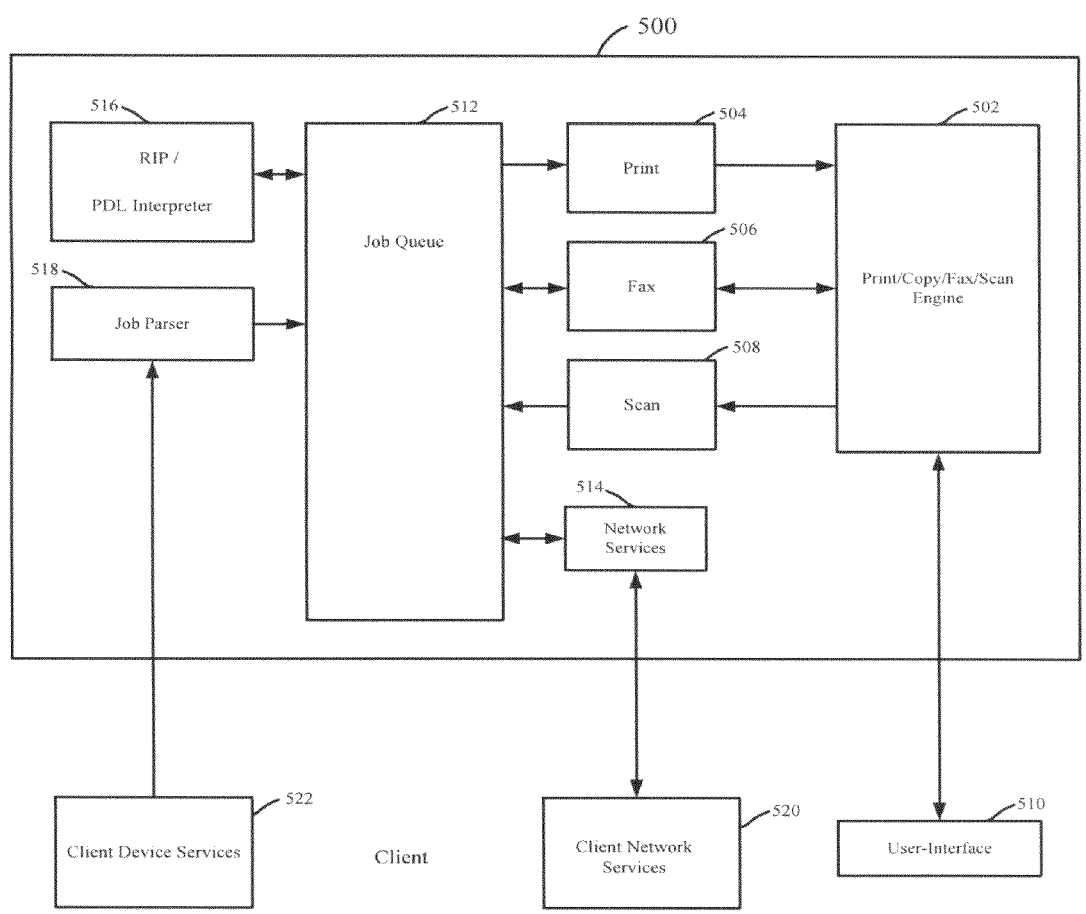
FIG. 5 is a functional diagram illustrating the controller for use in the system for backlit image detection according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
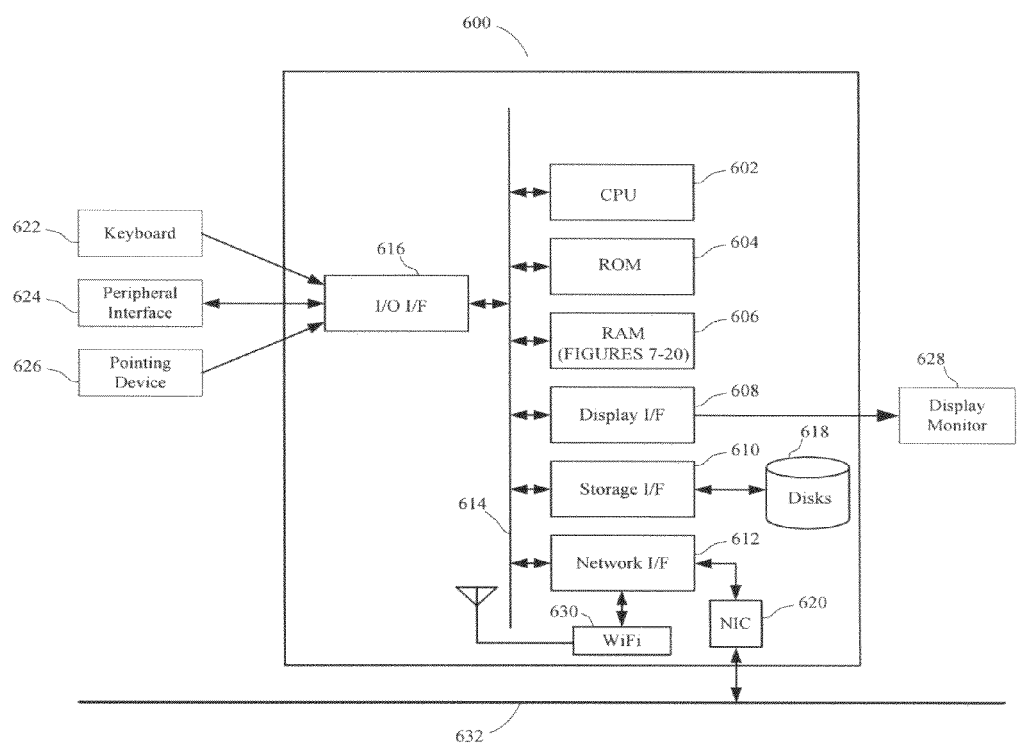
FIG. 6 is a diagram illustrating a workstation for use in the system for backlit image detection according to one embodiment of the subject application.

Turning now to FIG. 6, illustrated is a hardware diagram of a suitable workstation 600, shown in FIG. 1 as the computer workstation 116, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
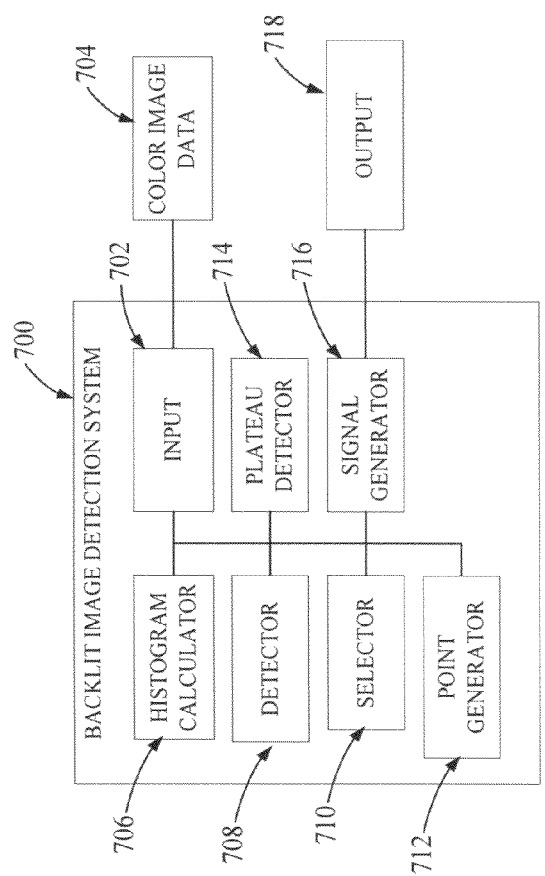
FIG. 7 is a block diagram illustrating the system for backlit image detection according to one embodiment of the subject application.

Turning now to FIG. 7, illustrated is a block diagram of a system 700 for backlit image detection in accordance with one embodiment of the subject application. The system 700 includes an input 702 configured to receive encoded color image data 704. The system 700 also includes a histogram calculator 706 that is operable to calculate histogram data from received color image data 704. A detector 708 of the system 700 then detects a mid-tone range in normalized histogram data. A zone of normalized pixel counts within the mid-tone range is then selected via a selector 710 associated with the system 700.

The system 700 further incorporates a point generator 712 that is configured to generate data representing the entry point and the exit point of the normalized histogram data with respect to the selected zone. The backlit image detection system 700 also includes a plateau detector 714 that is operable to detect a plateau area in the histogram data in the selected zone between the entry point and the exit point. In addition, the system 700 is equipped with a backlit image detection signal generator 716 that is capable of generating an output 718 indicative as to whether a backlit image portion is present in the color image data in accordance with an output of the plateau detector.

Figure 8:
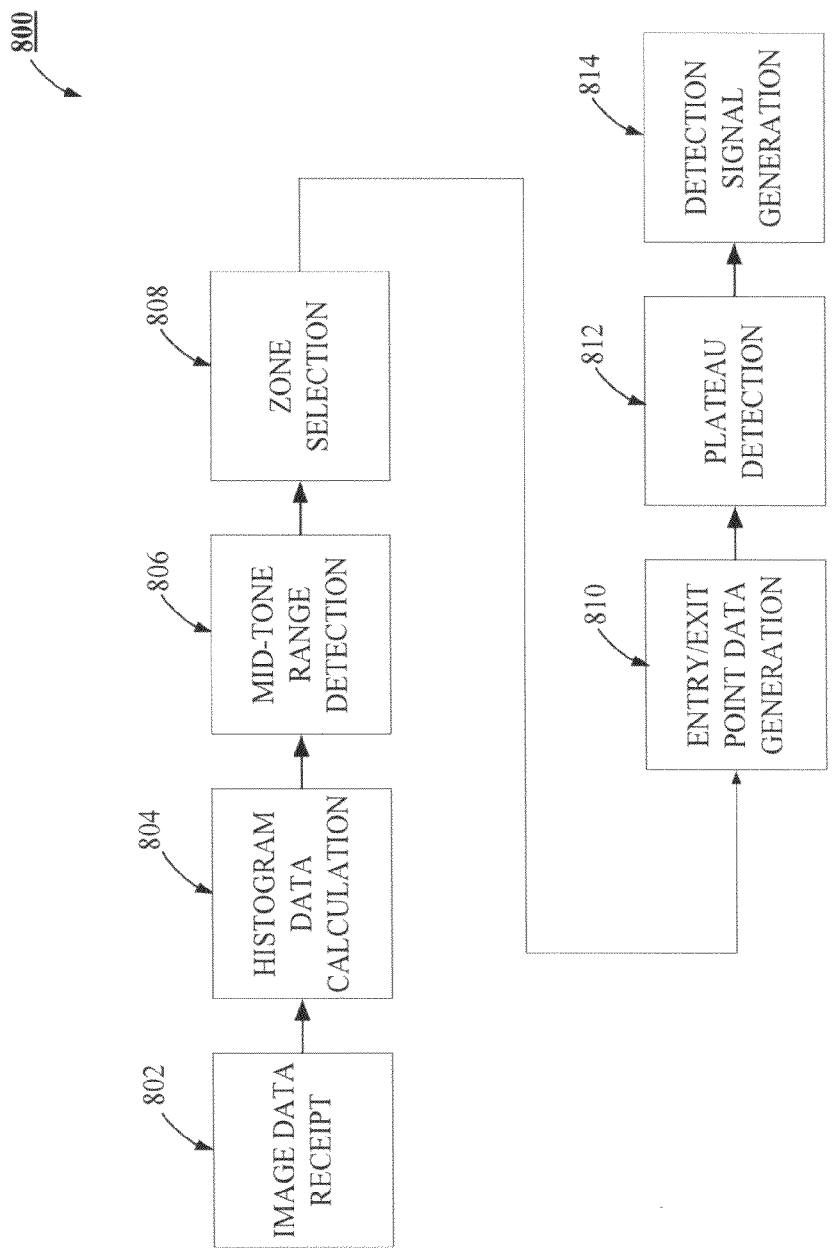
FIG. 8 is a functional diagram illustrating the system for backlit image detection according to one embodiment of the subject application.

Referring now to FIG. 8, there is shown a functional diagram illustrating the system 800 for backlit image detection in accordance with one embodiment of the subject application. As shown in FIG. 8, image data receipt 802 of encoded color image data first occurs into a computer having a processor and associated data storage. Histogram data calculation 804 is then performed from the received encoded color image data. Mid-tone range detection 806 then occurs of a mid-tone range in normalized histogram data. Zone selection 808 is then performed of a zone of normalized pixel counts within the mid-tone range. Entry/exit point data generation 810 is thereafter performed so as to generate data representing an entry point and an exit point of the normalized histogram data with respect to the zone from the zone selection 808.

Plateau detection 812 then occurs of a plateau area in the histogram data in the selected zone between the entry point and the exit point. Thereafter, detection signal generation 814 is performed of a backlit image detection signal which indicates whether a backlit image portion is present in the encoded color image data based upon the results of the plateau detection 812.

Figure 9:
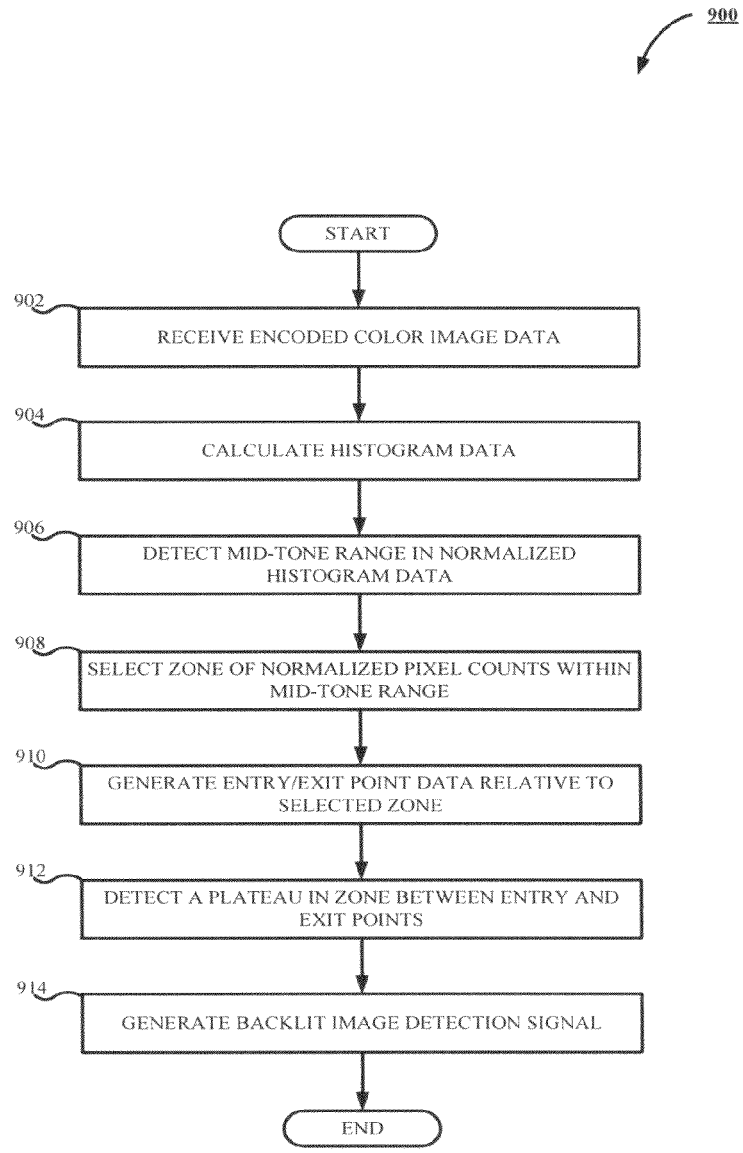
FIG. 9 is a flowchart illustrating a method for backlit image detection according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the example implementations illustrated in FIGS. 11-20. Turning now to FIG. 9, there is shown a flowchart 900 illustrating a method for backlit image detection in accordance with one embodiment of the subject application. Beginning at step 902, encoded color image data is first received into a computer having a processor and associated data storage at step 902. It will be appreciated by those skilled in the art that such computer is capable of being the controller 108 associated with the document processing device 104, the computer workstation 116, or the like, including their respective storage devices 110 and 118. The skilled artisan will further appreciate that any suitable computer known in the art is also capable of facilitating the methodology of the subject application, as set forth in FIG. 9. At step 904, histogram data is calculated from the received encoded color image data.

A mid-tone range in normalized histogram data is then detected at step 906. The skilled artisan will appreciate that such normalized histogram data is suitably obtained via any method known in the art. At step 908, a zone of normalized pixel counts within the mid-tone range is selected. Data representing an entry point and an exit point of the normalized histogram data relative to the selected zone is then generated at step 910. At step 912, a plateau area is detected in the histogram data in the selected zone between the entry point and the exit point. Thereafter, at step 914, a backlit image detection signal is generated indicating whether a backlit image portion is present in the color image data based upon an output of the plateau detection step 912.

Figure 10:
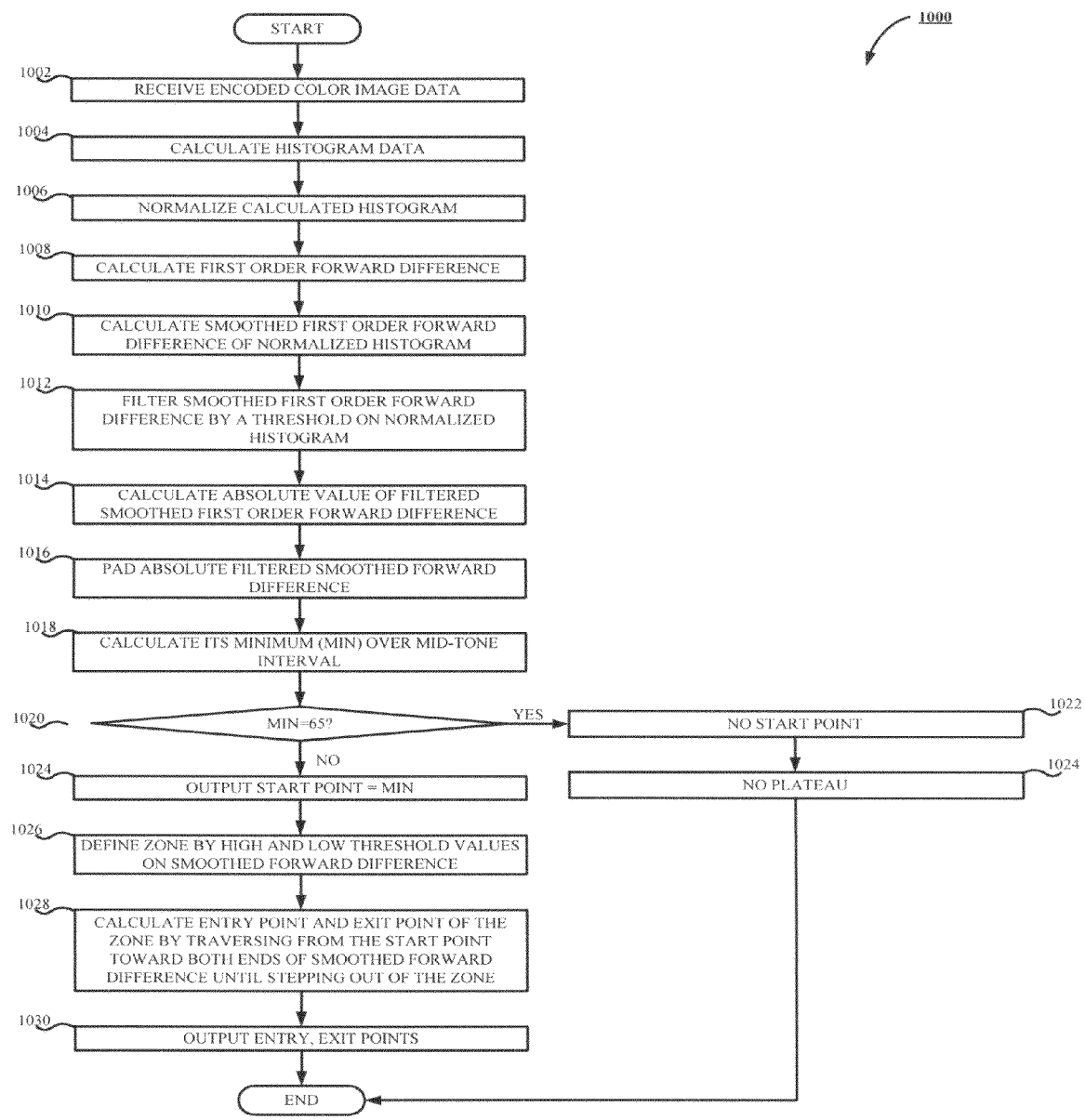
FIG. 10 is a flowchart illustrating a method for backlit image detection according to one embodiment of the subject application.

Referring now to FIG. 10, there is shown a flowchart 1000 illustrating a method for backlit image detection in accordance with one embodiment of the subject application. The methodology of FIG. 10 begins at step 1002, whereupon encoded color image data is received by the controller 108, the user device 116, or other suitable processing device capable of performing the functions described hereinafter with respect to FIG. 10. At step 1004, a histogram is calculated from the received encoded color image data. It will be appreciated by those skilled in the art that color image data is typically stored as red, green, blue in 8-bit code values between 0 and 255. The histogram $H_R$ associated with such encoded color image data is an array of 256 entries where $H_R[i]$ is the number of pixels in the image with code value i in red. For example, $H_R[0]$ is the number of pixels in the image with code value 0 in red, $H_R[1]$ is the number of pixels in the image with code value 1 in red, $H_R[2]$ is the number of pixels in the image with code value 2 in red, etc. Similarly, $H_G[i]$ is the number of pixels in the image with code value i in green, and $H_B[i]$ is the number of pixels in the image with code value i in blue. The composite histogram H is the sum of $H_R$, $H_G$ and $H_B$, i.e., $H[i]=H_R[i]+H_G[i]+H_B[i]$, and the normalized histogram N is the composite histogram H divided by P, the total number of pixels in the image, i.e., $N[i]=H[i]/P$. The accumulated histogram A is an array of 256 entries where $A[0]=N[0]$, and $A[j]=A[j-1]+N[j]$, for j=1 to 255.

Figure 11:
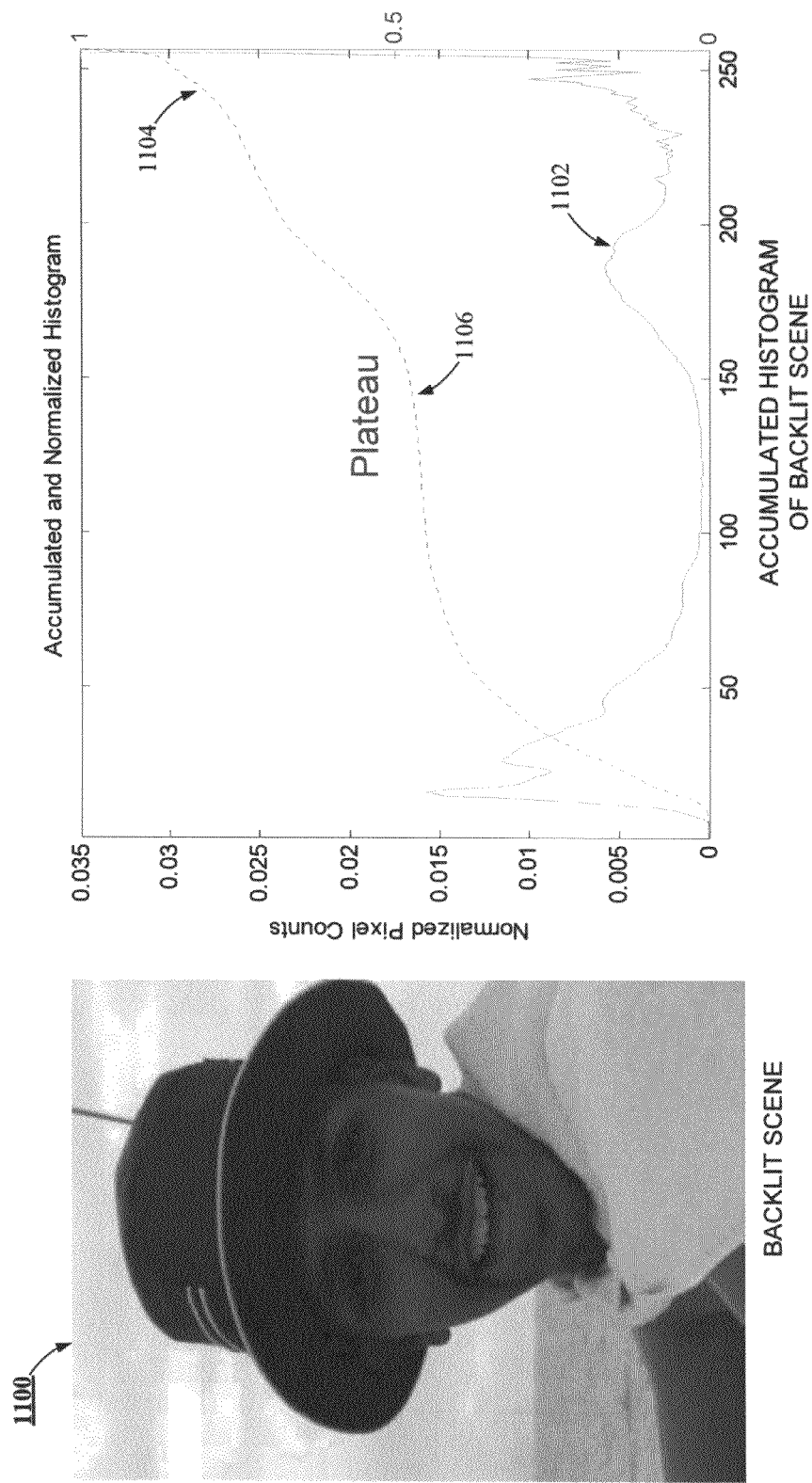
FIG. 11 is an example of a backlit scene input image and associated accumulated normalized histogram in accordance with the system for backlit image detection according to one embodiment of the subject application.

At step 1006, the calculated histogram is normalized as will be understood by those skilled in the art. FIG. 11 shows a typical backlit scene 1100 and its normalized histogram 1102 (in green) as well as its accumulated histogram 1104 (in blue). Typically in a backlit scene, e.g. the input image 1100 of FIG. 11, there is a bright background and a dark foreground, and as will be understood by those skilled in the art, there is an extended mid-tone range (roughly 100 to 150 in the image 1100 of FIG. 11) where pixel counts are low. In accordance with one embodiment of the subject application, this low pixel count is representative of the level-off, i.e., the "plateau" phenomenon, in the accumulated histogram, illustrated as the plateau 1106 in FIG. 11.

Figure 12:
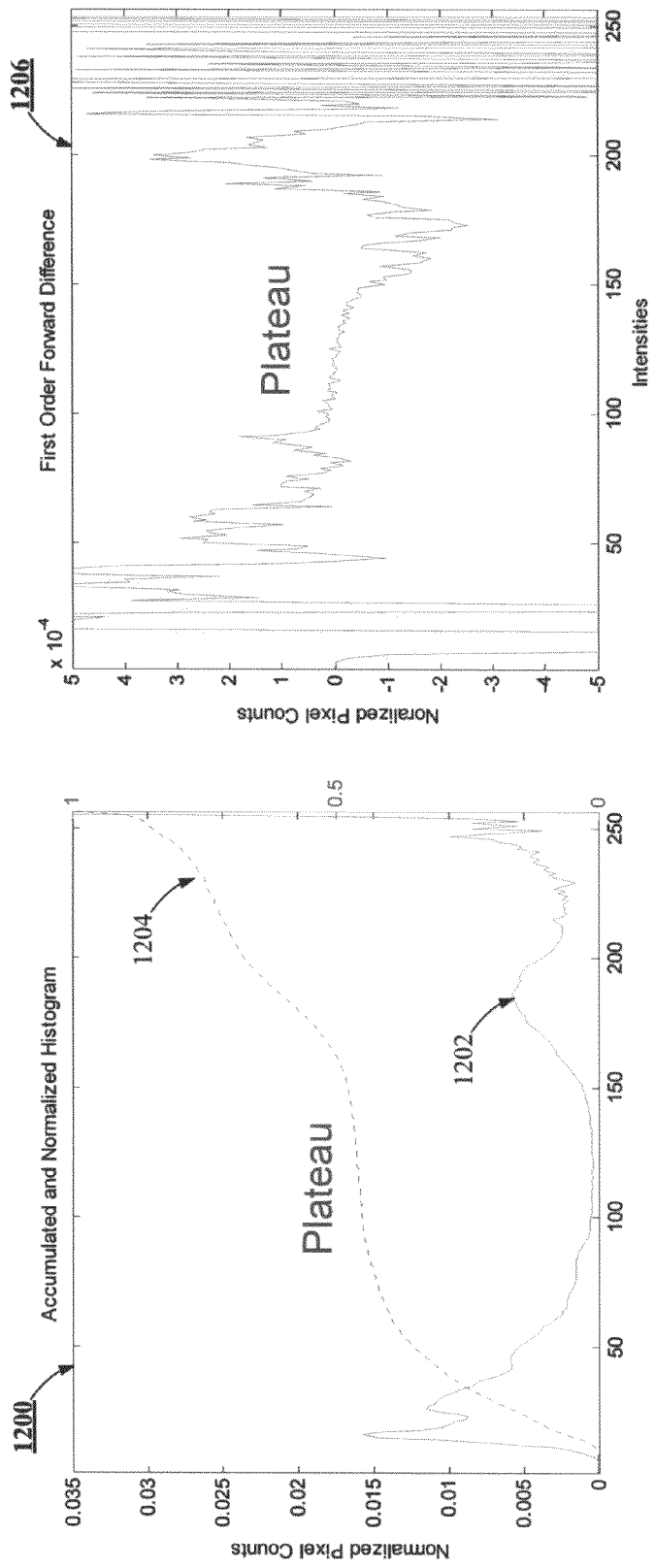
FIG. 12 is an example of an accumulated normalized histogram and the associated first order forward difference in accordance with the system for backlit image detection according to one embodiment of the subject application.

In order to detect an extended range with low pixel counts, one can detect an extended mid-tone range where the first derivative (the tangent) of normalized histogram is close to zero. Thus, at step 1008, the first order forward difference of the normalized histogram is calculated. In accordance with one embodiment of the subject application, the first order forward difference is an array of 256 entries where FD[0]=FD[0], and FD[j]=FD[j]−FD[j−1], for j=1 to 255; where "FD" represents the first order forward difference of the normalized histogram. FIG. 12 illustrates a normalized and accumulated histogram 1200, depicting the normalized histogram 1202 (in green), its accumulated histogram 1204 (in blue) and the first order forward difference of the normalized histogram 1206 (in red).

Figure 13:
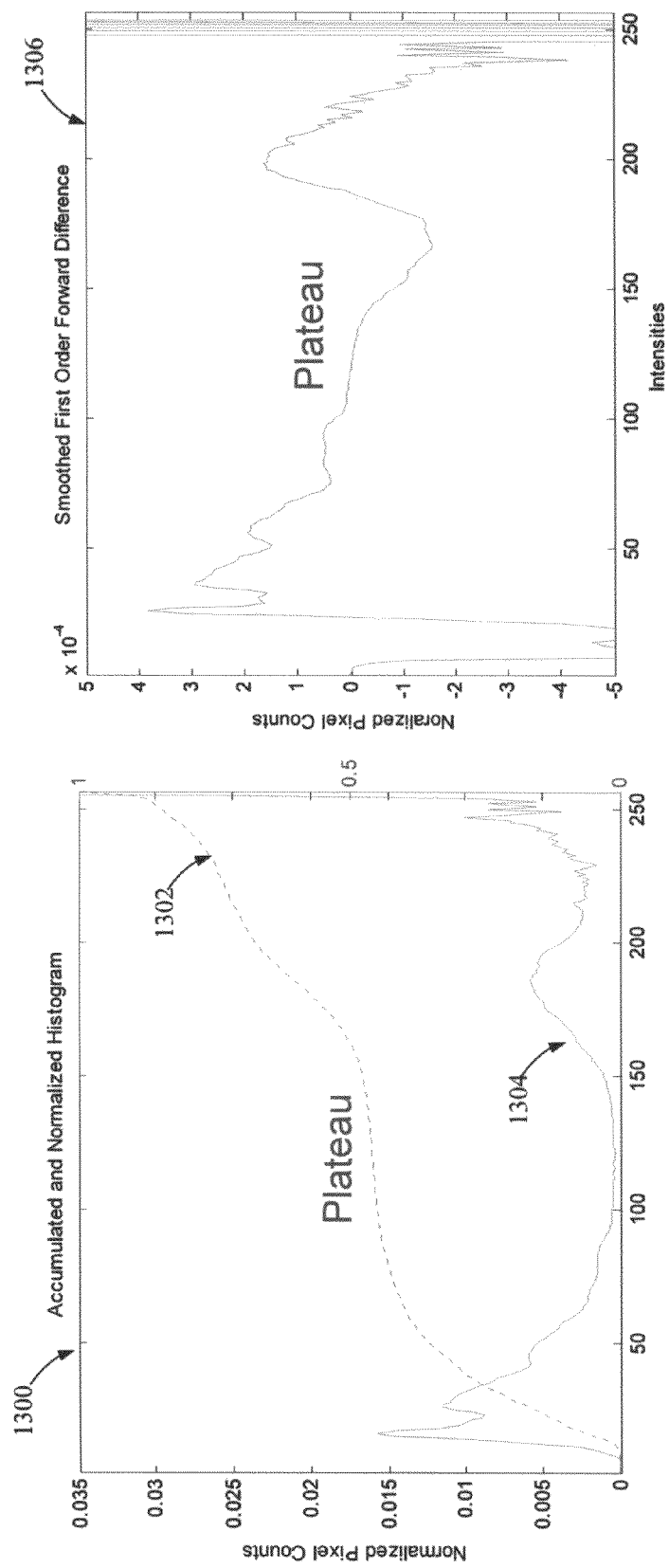
FIG. 13 is an example accumulated normalized histogram and the associated smoothed first order forward difference in accordance with the system for backlit image detection according to one embodiment of the subject application.

At step 1010, the smoothed first order forward difference of the normalized and accumulated histogram is calculated by the controller 108, the user device 116, or other suitable processing device. It will be understood by those skilled in the art, such smoothing, or averaging, is applied to the first order forward difference of the normalized histogram so as to reduce the undulations. FIG. 13 depicts an accumulated and normalized histogram 1300, with the normalized histogram 1302 (in green), its accumulated histogram 1304 (in blue), and the smoothed first order forward difference of the normalized histogram 1306 (in red).

Figure 14:
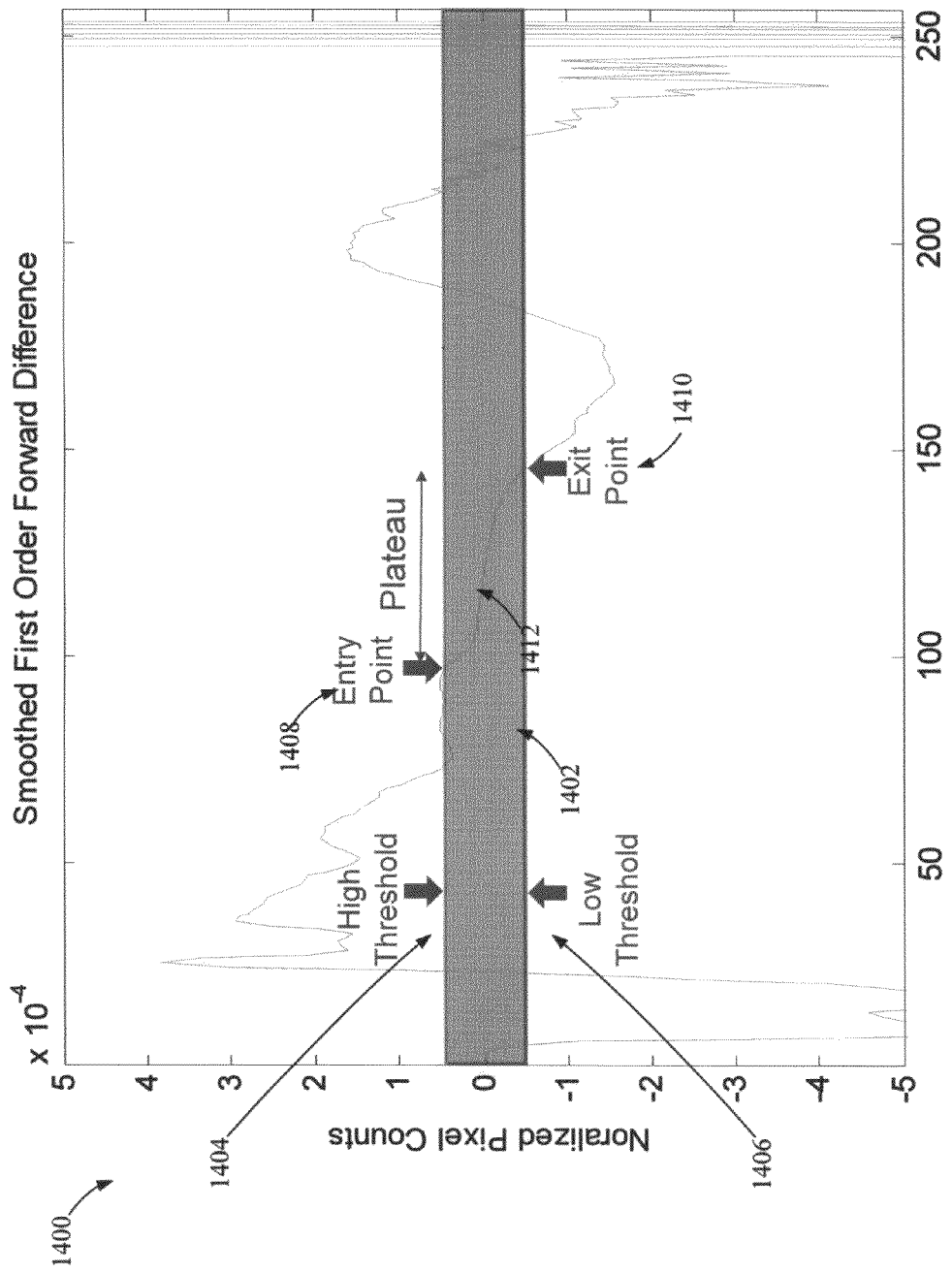
FIG. 14 is an example of a smoothed first order forward difference accumulated and normalized histogram of an input image in accordance with the system for backlit scene detection according to one embodiment of the subject application.

Turning now to FIG. 14, there is illustrated a smoothed first order forward difference 1400 of a normalized histogram. It will be understood by those skilled in the art that the subject application is suitably adapted to detect whether there is an extended mid-tone range where the smoothed first order forward difference is close to zero, i.e., if its absolute value is less than a threshold Th. From these calculations, it is possible to define a zone 1402 bounded by High Threshold Th (1404) and Low Threshold −Th (1406) such that the smoothed first order forward difference is included in such a zone 1402 as illustrated in blue in FIG. 14. Therefore, it will be appreciated by those skilled in the art that a traverse along the smoothed first order forward difference indicates the entry point 1408 and the exit point 1410 to the zone 1402, so that the interval between the entry point 1408 and the exit point 1410 is the plateau 1412.

Figure 15:
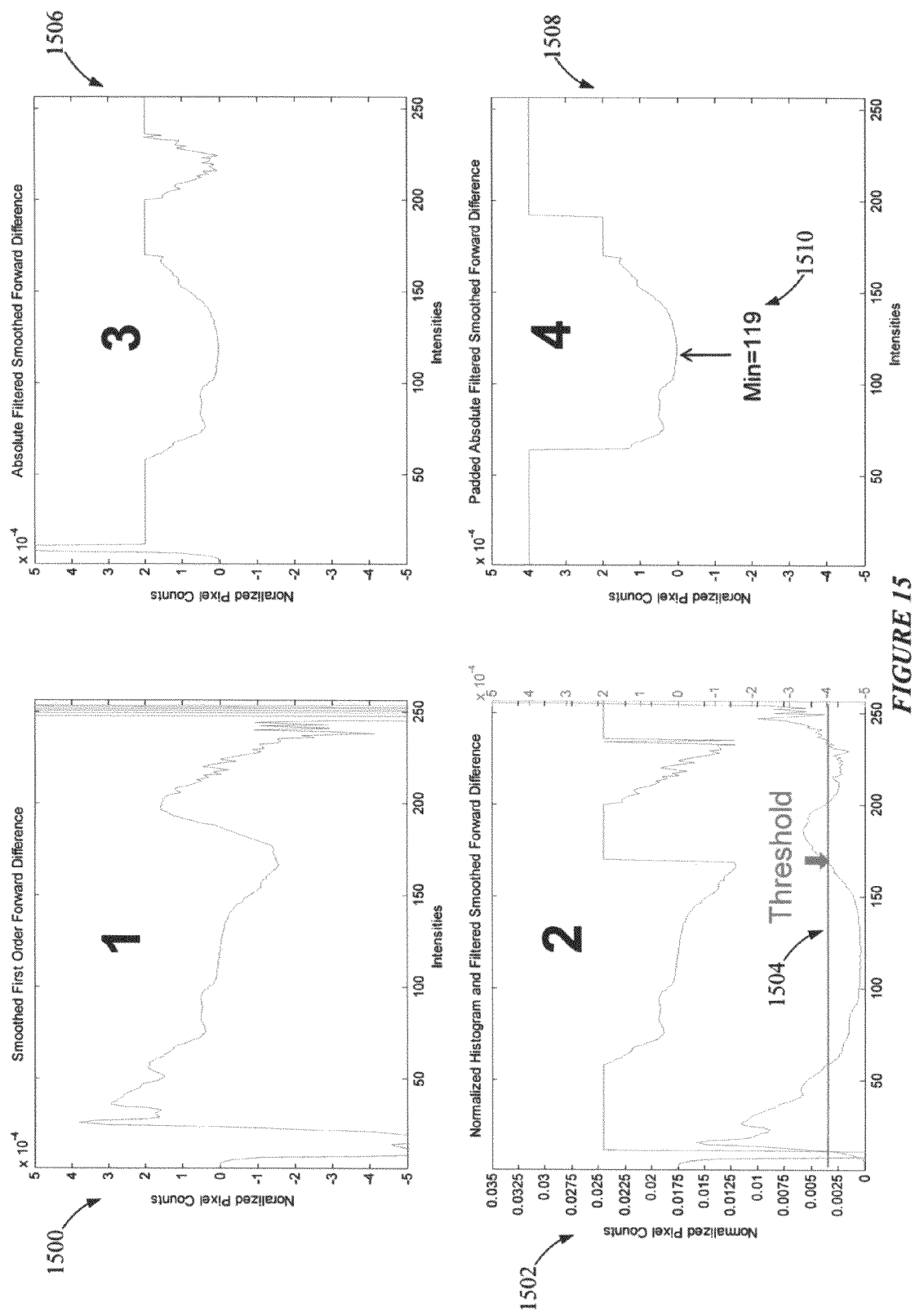
FIG. 15 is an example of a smoothed first order forward difference, the associated filtered first order forward difference, the associated absolute filtered first order forward difference, and the associated padded absolute filtered first order forward difference of a normalized histogram of an input image in accordance with the system for backlit scene detection according to one embodiment of the subject application.

Operations then proceed to step 1012, whereupon the smoothed first order forward difference is filtered by a threshold on the normalized histogram. FIG. 15 depicts an illustration of the progression of steps 1012 through step 1018 and as such is used in conjunction with the methodology of FIG. 10 for example purposes only. From the smoothed first order forward difference 1500 of FIG. 15, the filtered smoothed forward difference 1502 is calculated by filtering it through a threshold (Th') 1504 applied to normalized histogram N, i.e., for i=0 to 255, FSFD[i]=SFD[i] if N[i]<Th', and FSFD[i]=SN, otherwise; where Th' is a threshold value, empirically determined 0.0035, "FSFD" represents the filtered smoothed first order forward difference of the normalized histogram, "SFD" represents the smoothed first order forward difference of the normalized histogram, and SN is a pre-selected number to snap to, e.g., SN=0.0002 of the filtered smoothed forward difference 1502 of FIG. 15

After the filtering at step 1012, operations then proceed to step 1014, whereupon the absolute value of the filtered smoothed forward difference is calculated. A suitable example of the resultant absolute value of the filtered smoothed forward difference 1506 is illustrated in FIG. 15.

The absolute value of the filtered smoothed forward difference is then padded at step 1016. Such an absolute filtered smoothed forward difference of the normalized histogram 1506 is illustrated in FIG. 15. Preferably, such padding is accomplished by focusing on the search of the starting point within the mid-tone range between 65 and 192, i.e., the padded, absolute, filtered, smoothed, first order forward difference of the normalized histogram is defined as PAFSFD[i]=PAFSFD [i] if 64<I<=192, and PAFSFD[i]=SN', otherwise; where "PAFSFD" represents the padded, absolute, filtered, smoothed, first order forward difference of the normalized histogram, and SN' is a pre-selected number to snap to, e.g., SN'=0.0004 as illustrated at 1508 of FIG. 15. The skilled artisan will appreciate that such padding is performed on the extreme intervals [1, 64] and [192, 256] of the absolute filtered smoothed first order forward difference of the normalized histogram in accordance with one embodiment of the subject application. In accordance with one embodiment of the subject application, such padding includes the adding histogram values at an extreme upper range and an extreme lower range of the histogram data, as will be appreciated by those skilled in the art.

Figure 16:
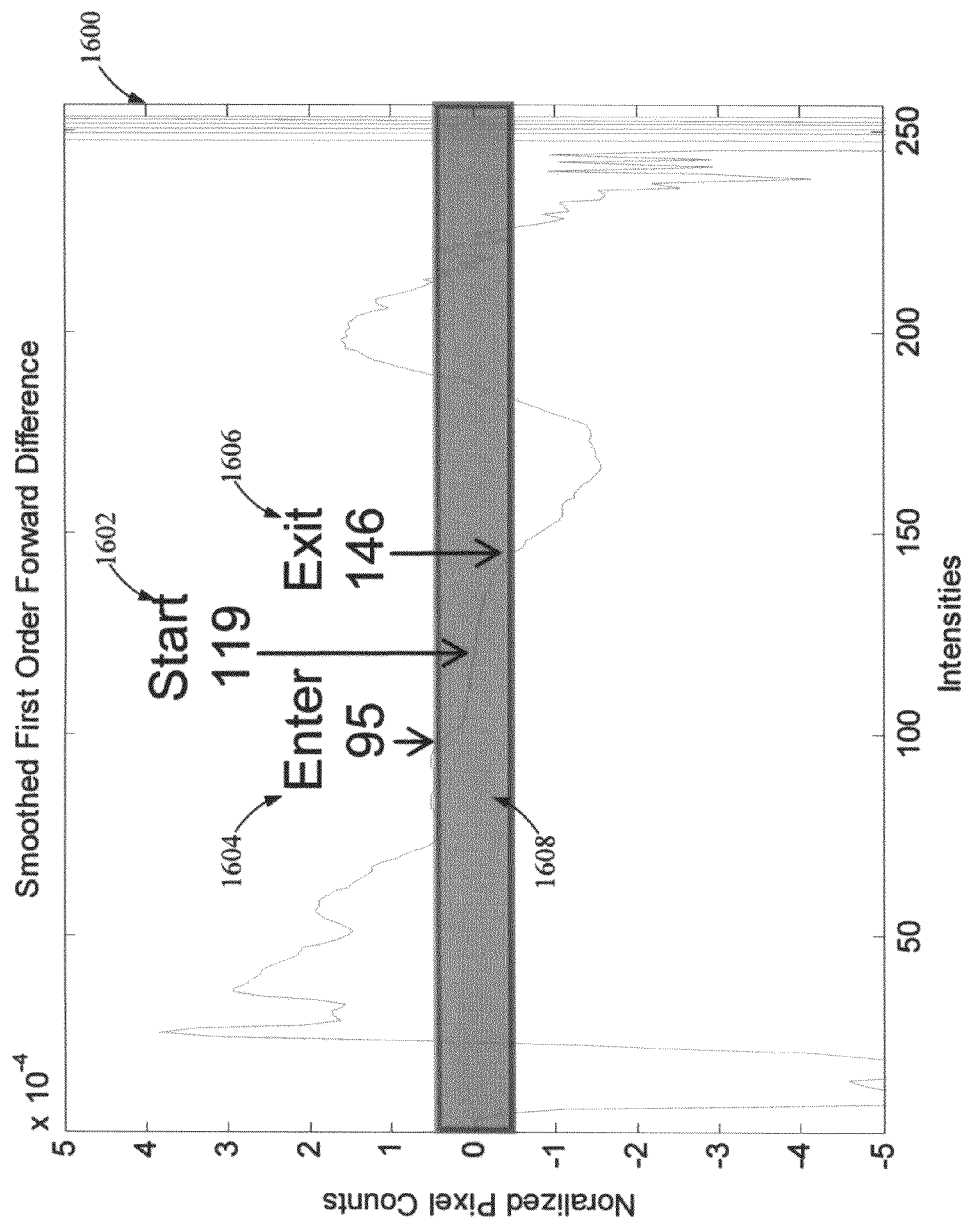
FIG. 16 is an example illustrating a start point for traversal, and entry/exit points of the mid-tone range zone of a smoothed first order forward difference of the normalized histogram in accordance with the system for backlit scene detection according to one embodiment of the subject application.

At step 1018, the minimum over the mid-tone interval is then calculated from the padded, absolute, filtered, smoothed, first order forward difference of the normalized histogram. According to one example embodiment of the subject application, the mid-tone interval is [65, 191]. As shown in FIG. 15, the minimum 1510 of the padded, absolute, filtered, smoothed, first order forward difference of the normalized histogram 1508 of FIG. 15 is 119 (min=119). FIG. 16 illustrates the smoothed first order forward difference of the normalized histogram 1600 (1500 of FIG. 15) with a more detailed depiction of the location of the start point, i.e. min=119, which is the start point 1602 from which a traversal on the smoothed, first order forward difference of the normalized histogram 1600 will start descending (to the left) to locate the entry point 1604 and ascending (to the right) to locate the exit point 1606 with respect to the zone 1608 as illustrated in FIG. 16.

A determination is then made at step 1020 whether the calculated minimum (min) is equal to a preselected minimum value. For example purposes only, a suitable preselected minimum value is 65, although the skilled artisan will appreciate that other preselected minimums are capable of being used based upon the desired interval. Upon a positive determination at step 1020, flow proceeds to step 1022, whereupon no start point is capable of being determined. Thereafter, a determination is made at step 1024 that no plateau is present in the normalized histogram of the input image, such that a backlit scene is not detected and operations with respect to FIG. 10 terminate.

Upon a determination at step 1020 that the calculated minimum does not equal the preselected value, e.g. 65, flow progresses to step 1026. At step 1026, a start point (equivalent to the calculated minimum) is then output. A zone is then defined at step 1028 by high and low threshold values on the smoothed first order forward difference. FIG. 14 suitably illustrates such high threshold 1402 and low threshold 1404 values, as well as the zone 1402. FIG. 16 also illustrates the defined zone 1608 bounded by the high and low thresholds.

At step 1030, the entry point 1604 and exit point 1606 of the zone 1608 are calculated by traversing from the start point 1602 towards both ends of the smoothed forward difference until stepping out of the zone occurs. Thereafter, entry point 1604 and exit point 1606 are output by the controller 108, the user device 116, or other suitable processing device indicative of a detected backlit scene at step 1032.

Figure 17:
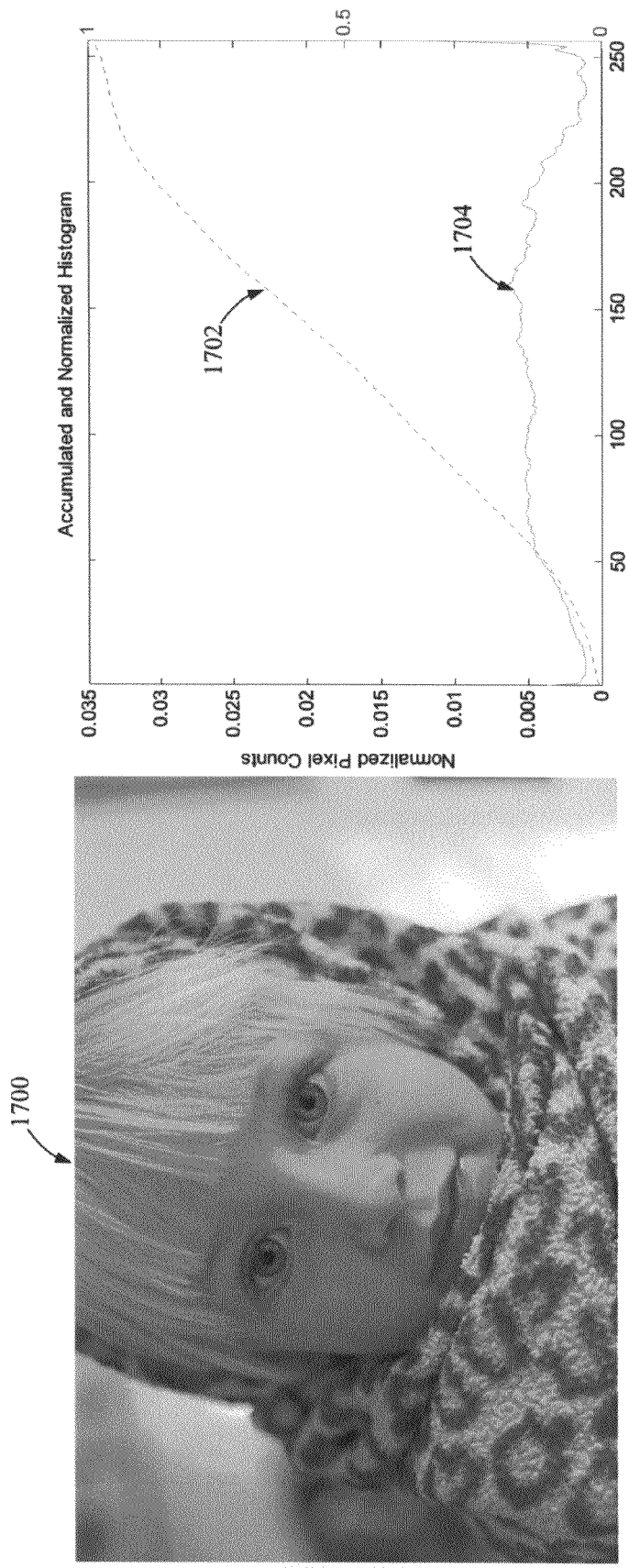
FIG. 17 is an example of an input image and its associated accumulated and normalized histogram in accordance with the system for backlit scene detection according to one embodiment of the subject application.
Figure 18:
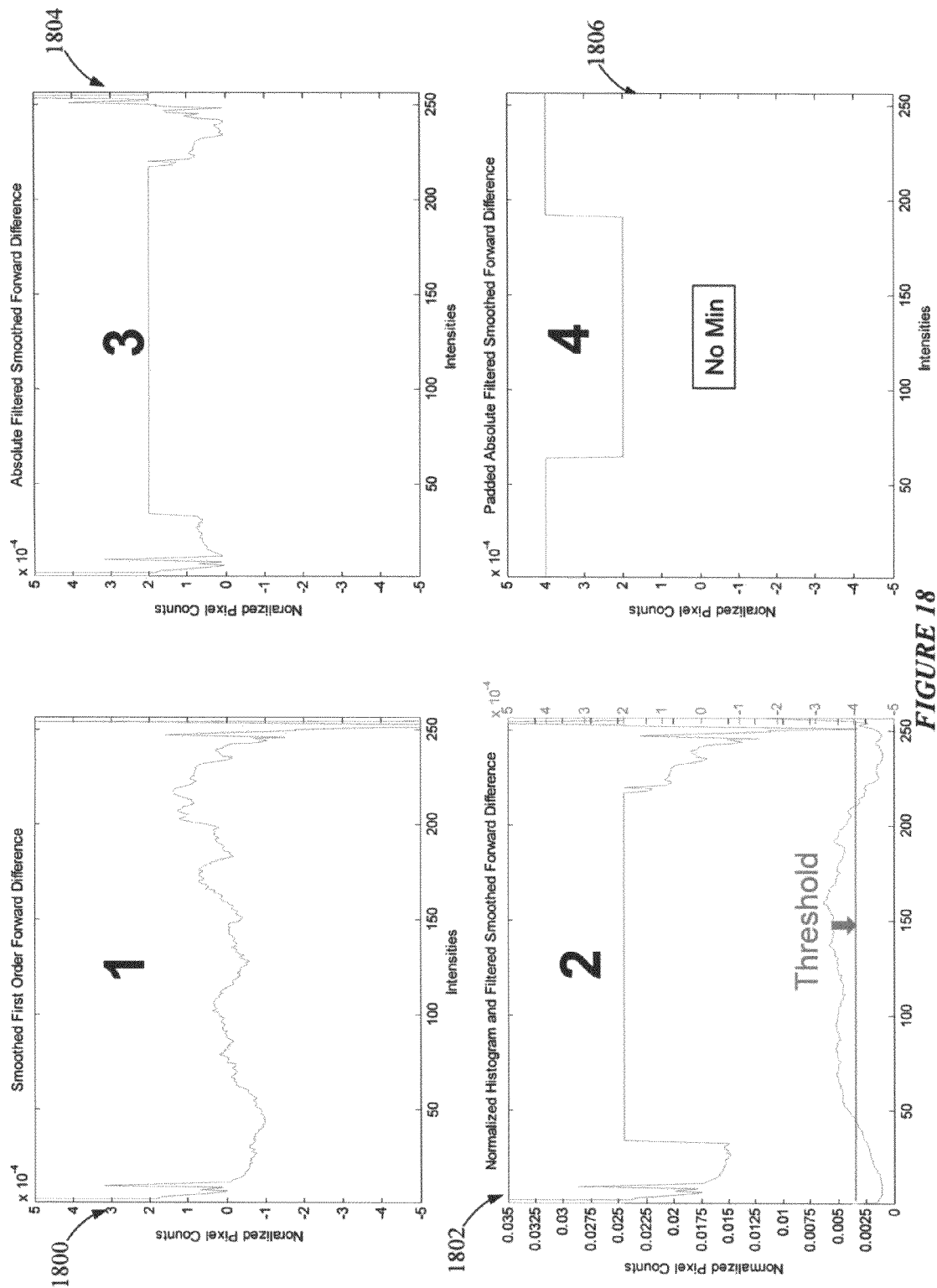
FIG. 18 an example of a smoothed first order forward difference, the associated filtered first order forward difference, the associated absolute filtered first order forward difference, and the associated padded absolute filtered first order forward difference of a normalized histogram of the input image of FIG. 17 in accordance with the system for backlit scene detection according to one embodiment of the subject application.
Figure 19:
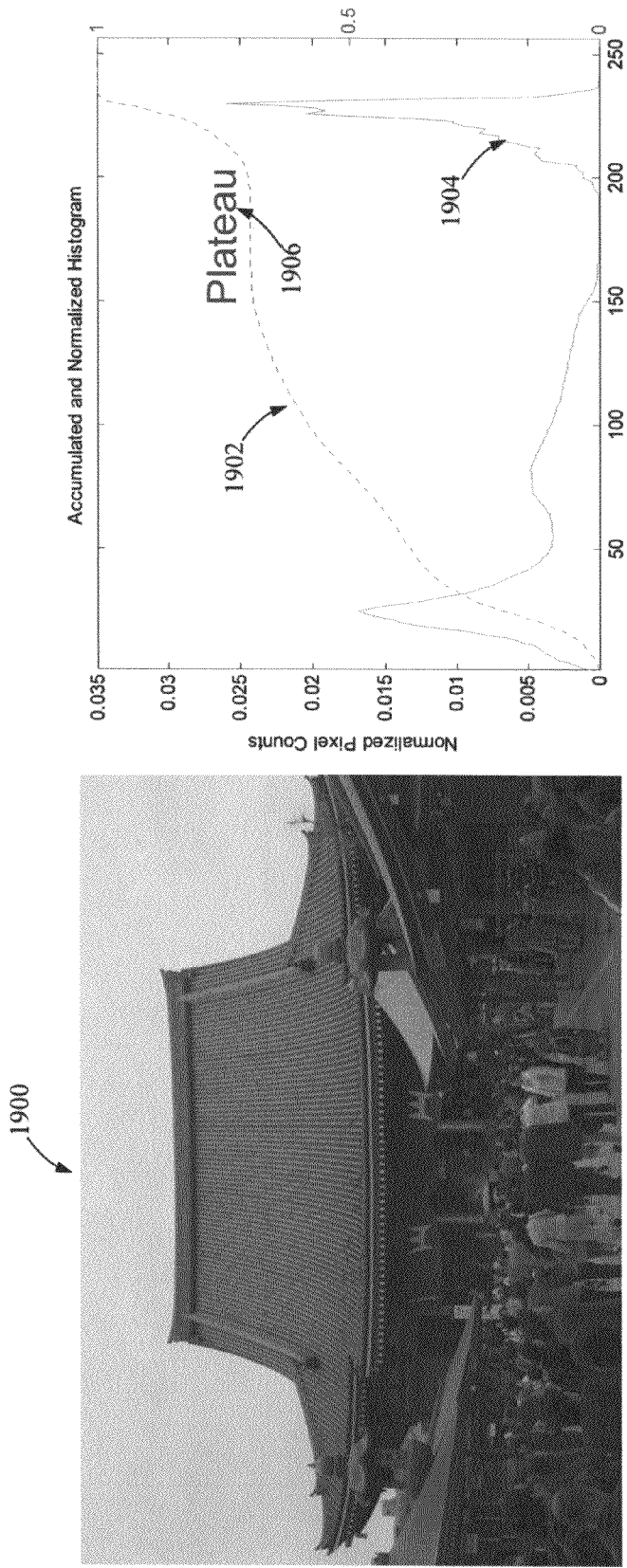
FIG. 19 is an example of an input image and its associated accumulated and normalized histogram in accordance with the system for backlit scene detection according to one embodiment of the subject application.
Figure 20:
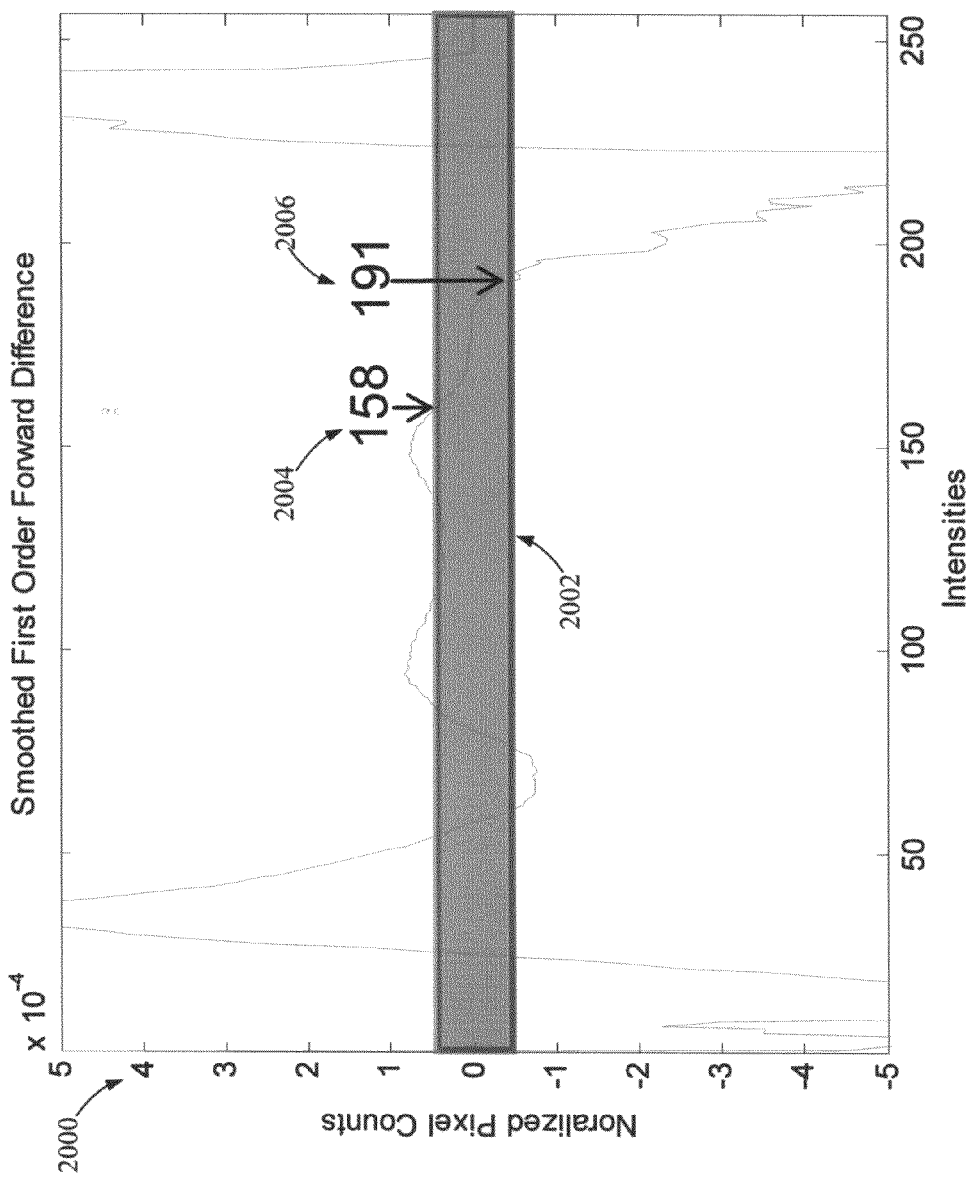
FIG. 20 is an example plateau detection result of the input image of FIG. 17 in accordance with the system for backlit scene detection according to one embodiment of the subject application.

FIG. 17 is an example of a non-backlit scene input image 1700 and its associated accumulated histogram 1702 and normalized histogram 1704, where no plateau is determined. Corresponding to the input image 1700 of FIG. 17, FIG. 18 illustrates the associated smoothed first order forward difference of its normalized histogram 1800, the associated filtered smoothed first order forward difference of the normalized histogram 1802, the associated absolute filtered smoothed forward difference of the normalized histogram, and the associated, padded, absolute, filtered, smoothed, first order forward difference of the normalized histogram 1806. It will be appreciated by those skilled in the art that there is no minimum of the padded, absolute, filtered, smoothed, first order forward difference of the normalized histogram 1806, e.g. specifically, the minimum of is 65, and resulting in nowhere to start the traversal. Upon such an occurrence, the methodology of the subject application indicates that no plateau is detected in the accumulated histogram. FIG. 19 illustrates another example of a backlit scene input image 1900 and its associated accumulated histogram 1902 and normalized histogram 1904. The skilled artisan will notice the associated plateau 1906 in its accumulated histogram 1902. FIG. 20 shows the plateau detection result 2000 and defined zone 2002, with an entry point 2004 at 158 and an exit point 2006 of 191.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A backlit image detection system comprising:
   an input for receiving encoded color image data;
   a histogram calculator operable to calculate histogram data from received color image data;
   a detector operable to detect a mid-tone range in normalized histogram data;
   a selector operable to select a zone of normalized pixel counts within the mid-tone range;
   a point generator operable to generate data representative of an entry point and an exit point of the normalized histogram data relative to the selected zone, the point generator including:
      a filter operable to smooth a forward difference of the histogram data by application of a threshold value on the normalized histogram data,
      an adder operable to add histogram values at an extreme upper range and an extreme lower range of the normalized histogram data,
      a minimum value calculator operable to calculate a minimum value over the mid-tone range, and
      a comparator operable to generate the entry point in accordance with a comparison of the calculated minimum value with a preselected minimum value;
   a plateau detector operable to detect a plateau area in the normalized histogram data in the selected zone between the entry point and the exit point; and
   a backlit image detection signal generator operable to generate an output indicative as to whether a backlit image portion is present in the color image data in accordance with an output of the plateau detector.

2. The system of claim 1 wherein the point generator further includes an exit point detector operable in accordance with a traverse of the normalized histogram data through the selected point to a transition point therebetween complementary to the entry point.

3. The system of claim 1 further comprising an absolute value generator operable to generate an absolute value of the normalized histogram data and the smoothed forward difference of the histogram data prior to operation of the adder thereon.

4. The system of claim 1 further comprising a first order difference calculator operable to calculate a first order difference of the normalized histogram data prior to operation of the detector thereon.

5. A method of detecting backlit images comprising:
   receiving encoded color image data into a computer having a processor and associated data storage;
   calculating histogram data from received color image data;
   detecting a mid-tone range in normalized histogram data;
   selecting a zone of normalized pixel counts within the mid-tone range;
   generating data representative of an entry point and an exit point of the normalized histogram data relative to the selected zone the generating including:
      smoothing a forward difference of the histogram data by application of a threshold value on the normalized histogram data,
      adding histogram values at an extreme upper range and an extreme lower range of the normalized histogram data,
      calculating a minimum value over the mid-tone range, and
      generating the entry point in accordance with a comparison of the calculated minimum value with a preselected minimum value;
   detecting a plateau area in the normalized histogram data in the selected zone between the entry point and the exit point; and
   generating a backlit image detection signal indicative as to whether a backlit image portion is present in the color image data in accordance with an output of the plateau detection step.

6. The method of claim 5 further comprising detecting the exit point in accordance with a traverse of the normalized histogram data through the selected point to a transition point therebetween complementary to the entry point.

7. The method of claim 5 further comprising generating an absolute value of the normalized histogram data and the smoothed forward difference of the histogram data prior to performing the step of adding thereon.

8. The method of claim 5 further comprising calculating a first order difference of the normalized histogram data prior to performing the detecting.

9. A system of detecting backlit images comprising:
   means for receiving encoded color image data into a computer having a processor and associated data storage;
   means for calculating histogram data from received color image data;
   means for detecting a mid-tone range in normalized histogram data;
   means for selecting a zone of normalized pixel counts within the mid-tone range;

means for generating data representative of an entry point and an exit point of the normalized histogram data relative to the selected zone, the means for generating including:
  means for smoothing a forward difference of the histogram data by application of a threshold value on the normalized histogram data,
  means for adding histogram values at an extreme upper range and an extreme lower range of the normalized histogram data,
  means for calculating a minimum value over the midtone range, and
  means for generating the entry point in accordance with a comparison of the calculated minimum value with a preselected minimum value;
means for detecting a plateau area in the normalized histogram data in the selected zone between the entry point and the exit point; and
mean for generating a backlit image detection signal indicative as to whether a backlit image portion is present in the color image data in accordance with an output of the plateau area detecting means.

10. The system of claim 9 further comprising means adapted for detecting the exit point in accordance with a traverse of the normalized histogram data through the selected point to a transition point therebetween complementary to the entry point.

11. The system of claim 9 further comprising means adapted for generating an absolute value of the normalized histogram data and the smoothed forward difference of the histogram data prior to performing the step of adding thereon.

12. The system of claim 9 further comprising means adapted for calculating a first order difference of the normalized histogram data prior to performing the detecting.

* * * * *